INVENTOR.
George A. Prell 3,254,573
SUPPORT FOR PRESSURE MEASURING
DIAPHRAGM
George A. Prell, Phoenix, Ariz., assignor to Motorola,
Inc., Franklin Park, Ill., a corporation of Illinois
Filed Oct. 3, 1963, Ser. No. 313,700
4 Claims. (Cl. 92—101)

This invention relates generally to instrumentation and particularly to an improvement in the design of diaphragm type pressure transducers.

The usual function of a diaphragm type transducer when used to measure pressure is to provide a reading based on the amount of deflection of the diaphragm, the deflection being a function of the total applied force due to the pressure. The deflecting force is the product of the pressure and the effective area of the diaphragm, so that if the deflection results in a change in the effective area, an error in the linearity of the deflection with pressure will occur. In many applications it is desirable that a pressure transducer have a linear response.

Another problem associated with the diaphragm of a pressure transducer is that the deflection at a given pressure may be different depending on whether the pressure has risen or has fallen to the given value. The amount of error due to this type of mechanical hysteresis is quite serious in those applications requiring a highly accurate response.

Accordingly, it is an object of this invention to improve diaphragm type pressure transducers so as to reduce the non-linearity and the hysteresis error of such devices.

A feature of this invention is a semi-flexible supporting member for the diaphragm of a pressure transducer which tends both to preserve the effective area of the diaphragm and improve the mechanical hysteresis characteristics of the transducer.

In accordance with this invention, the outer edges of the diaphragm are supported in such a way that when pressure is applied and deflects the central part of the diaphragm, the supported edge also deflects about the same amount thereby essentially preserving the shape of the diaphragm through the operating pressure range of the transducer. With such a design the deflection of the center of the diaphragm is a linear function of pressure to a high degree of approximation and also the mechanical hysteresis characteristics of the diaphragm are considerably improved.

Figure 1:
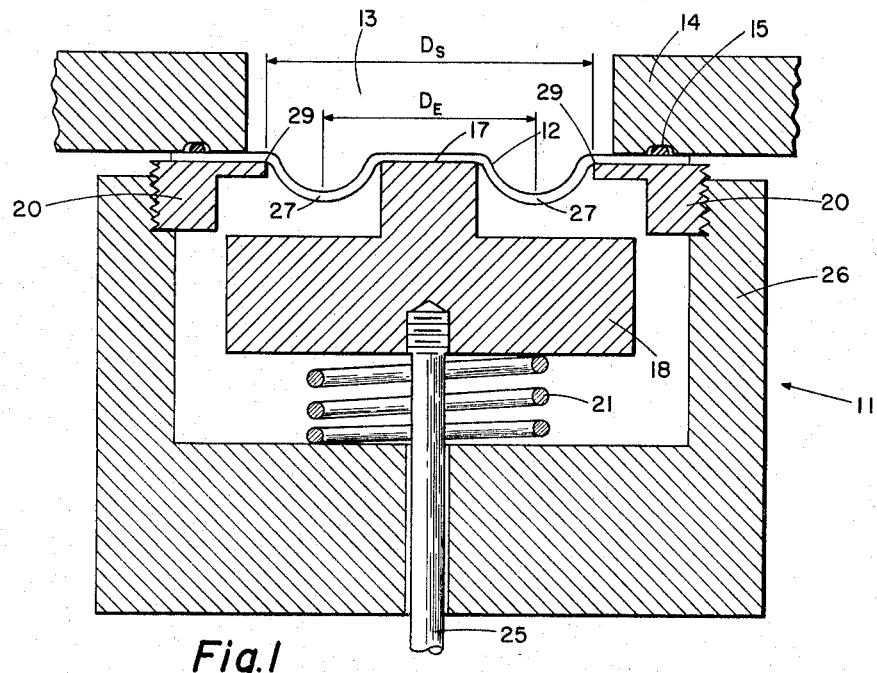
FIG. 1 is a sectional view of a representation at zero pressure of a pressure transducer having a semi-flexible diaphragm support in accordance with this invention.

Referring to the drawings, FIG. 1 is a sectional view of a portion of a transducer 11 at zero gage pressure. The pressure that is to be measured is applied to the circular diaphragm 12 through the circular opening 13 in the wall 14 of the chamber in which the pressure is to be measured. The O-ring 15 prevents leakage between the diaphragm 12 and the wall 14. The center of the diaphragm 12 rests on the top 17 of the portion of the piston 18 having the smaller diameter and on the diaphragm support 20. The spring 21 determines the deflection of the piston with applied force. An actuating rod 25 connected to the piston, guides the piston within the housing 26 and provides a linkage with a deflection sensing element (not shown). In an instrument of this type, the effective area of the diaphragm is defined by the diameter $D_E$. The effective area is thus the region within the circle of diameter $D_E$ 27 at the lowest point of the depressed region of the diaphragm, the metal at circle 27 being the inflection or effective pivot region of the diaphragm where bending is concentrated. The diameter $D_S$, concentric with $D_E$, is the diameter of the supported portion of the diaphragm; unless the diaphragm is thick, $D_S$ must be kept small in high pressure systems so that the diaphragm can sustain the operating load imposed on it. Note, for reference only, that in this figure the top edge of the support 29 is coplanar with the top of the piston 17.

Figure 2:
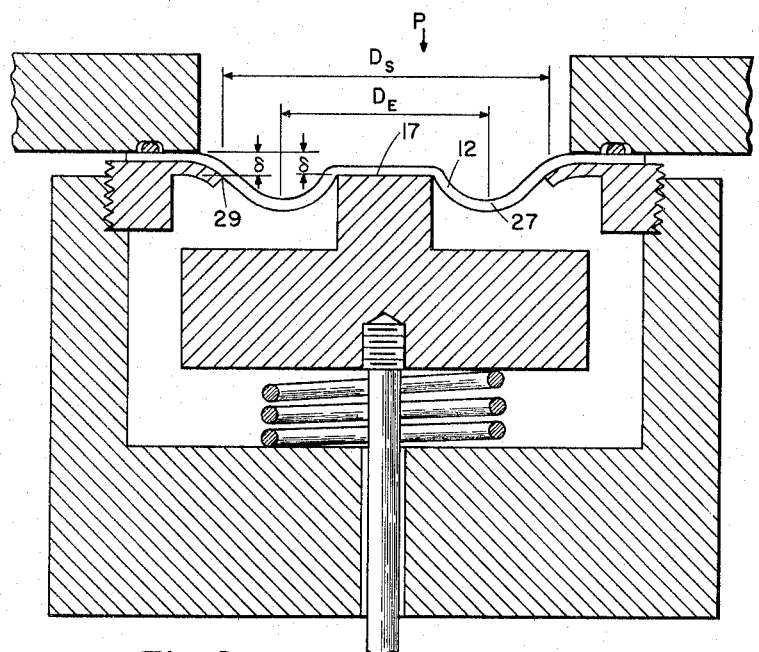
FIG. 2 is the sectional view of FIG. 1 but with pressure applied.

In FIG. 2, the center of the diaphragm is shown deflected from its original position by an amount $\delta$ by an applied pressure P on the diaphragm. The edge 29 of the support 20 is also deflected by an amount $\delta$ so that the edge 29 of the support and the top of the piston 17 are still coplanar; for typical displacemnts of the order of a few thousands of an inch, the support diameter is still almost exactly $D_S$. Under these circumstances, the shape of the diaphragm in FIG. 2 is the same as in FIG. 1 and there is no change in $D_E$ so that the effective area is constant under the applied pressure P. In this case deflection is a linear function of pressure as well as of force.

Figure 3:
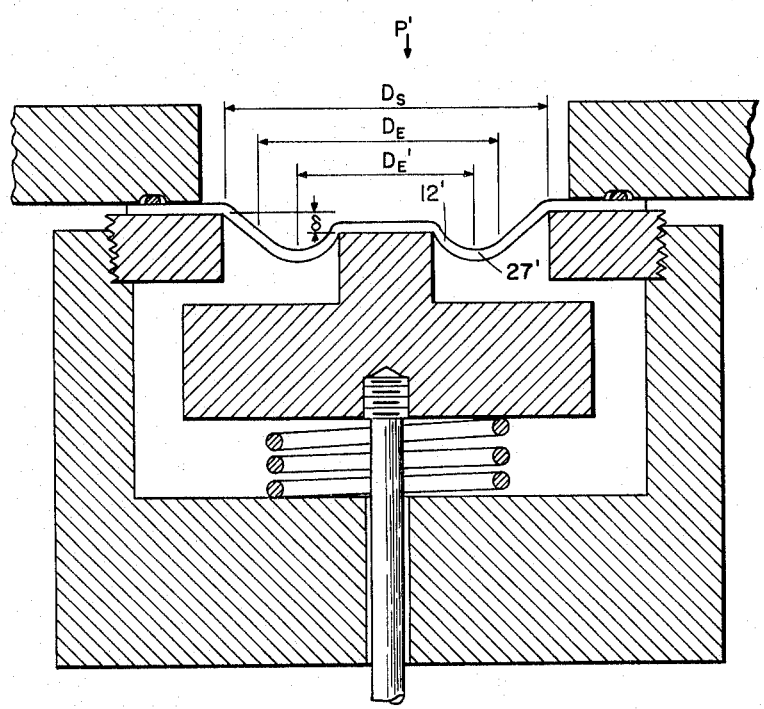
FIG. 3 is the cross sectional view, with pressure applied, of a transducer similar to FIGS. 1 and 2 in which the diaphragm is rigidly supported.

FIG. 3 shows a cross section of a transducer of a type differing from FIGS. 1 and 2 only in the fact that the diaphragm support is rigid. Under pressure if its diaphragm 12' is deflected the distance $\delta$ it must assume a new shape. Since the supported edges are not free to move, the lower portion of the diaphragm 27' i.e., the inflection region, has been caused to shift and is now nearer the center of the diaphragm so that the effective diameter is now $D_E'$ which is less than the original effective area $D_E$. The consequent reduction in effective area resulting from the deflection prevents a linear response with respect to deflection versus pressure, and a pressure P' greater than P is required to give the deflection $\delta$.

Hysteresis in a diaphragm is a function of the crystalline structure of the material, and results from the internal friction as the diaphragm changes shape with changes in load. In the present invention, since the shape of the diaphragm is preserved, the use of a flexible support material (having itself low hysteresis) can prevent any but the slightest changes in the shape of the diaphragm so that hysteresis effects are greatly reduced. Several of two different types of transducers for use in 0 to 1600 p.s.i. range were compared. The transducers were no different except in the manner of supporting the diaphragm. One type used a rigidly supported diaphragm, the other a diaphragm supported in accordance with this invention. The results are shown in tabular form in Table I.

Table I

|  | Rigid Support | Flexible Support |
| --- | --- | --- |
| Diaphragm Material | Stainless Steel | Stainless Steel (same type). |
| Diaphragm Thickness | .005 | .005. |
| Supported Diameter of the Diaphragm. | .5 | .5. |
| Flexible Support Material |  | Stainless Steel. |
| Thickness of Flexible Support |  | 0.040. |
| Full Range Deflection | 0.0025 | 0.0025. |
| Error in Linearity | 0.75% | 0.25%. |
| Hysteresis Error | 2.5% | 0.2%. |

The described diaphragm support system may be used in either high or low pressure measurement but it is especially valuable for high pressure measurement or other applications where small semi-rigid diaphragms are required since such diaphragms when rigidly supported tend to have the larger errors. The errors in linearity and those due to hysteresis are often reduced by a factor of 10 to 1 or more by using the flexible diaphragm support.

I claim:
1. in a pressure transducer, the combination of a diaphragm, a sensing mechanism for measuring the deflection of said diaphragm with pressure, and a supporting means for the outer portion of said diaphragm, said supporting means so formed to deflect with pressure on said diaphragm in order to maintain the effective area of said diaphragm substantially constant within the operating pressure range of the transducer.

2. In a pressure transducer, the combination of a semi-rigid diaphragm having a central effective area bounded circumferentially by an inflection region, a sensing mechanism for measuring the deflection of said diaphragm with pressure, and a resilient yieldable support structure supporting said diaphragm peripherally of said inflection region for reducing the tendency for said effective area to change in size with pressure applied to said diaphragm.

3. A pressure transducer with improved linearity and hysteresis characteristics, including in combination a semi-rigid diaphragm having an effective area bounded circumferentially by an inflection region, a sensing mechanism for measuring deflection of said diaphragm with applied pressure, and means supporting said diaphragm peripherally of said inflection region, said supporting means comprising a semi-rigid ledge thin enough to bend with pressure applied to said diaphragm in order to maintain the effective area of said diaphragm substantially constant within the operating pressure range of said transducer.

4. A pressure transducer with improved linearity and hysteresis characteristics, said transducer including in combination a semi-rigid diaphragm having an effective area centrally thereof bounded circumferentially by a depressed inflection region, a piston at one side of said central area for transmitting deflection of said diaphragm, a housing having a recess-opening receiving said piston and a shoulder at the mouth of said recess-opening, and means at said shoulder supporting said diaphragm peripherally of said depressed inflection region, said supporting means region comprising a semi-rigid ledge projecting inwardly of said shoulder and thin enough to bend toward the bottom of said recess opening with pressure applied to said diaphragm in order to maintain the effective area of said diaphragm substantially constant within the operating pressure range of said transducer.

References Cited by the Examiner
UNITED STATES PATENTS
3,124,959   3/1964   Pall et al. _____ 73—407

DAVID SCHONBERG, *Acting Primary Examiner.*